Sept. 15, 1925.  
J. W. THOMPSON  
BOLL WEEVIL CATCHER  
Filed Aug. 11, 1923

J. W. Thompson, Inventor

By C. A. Snow & Co.

Attorneys

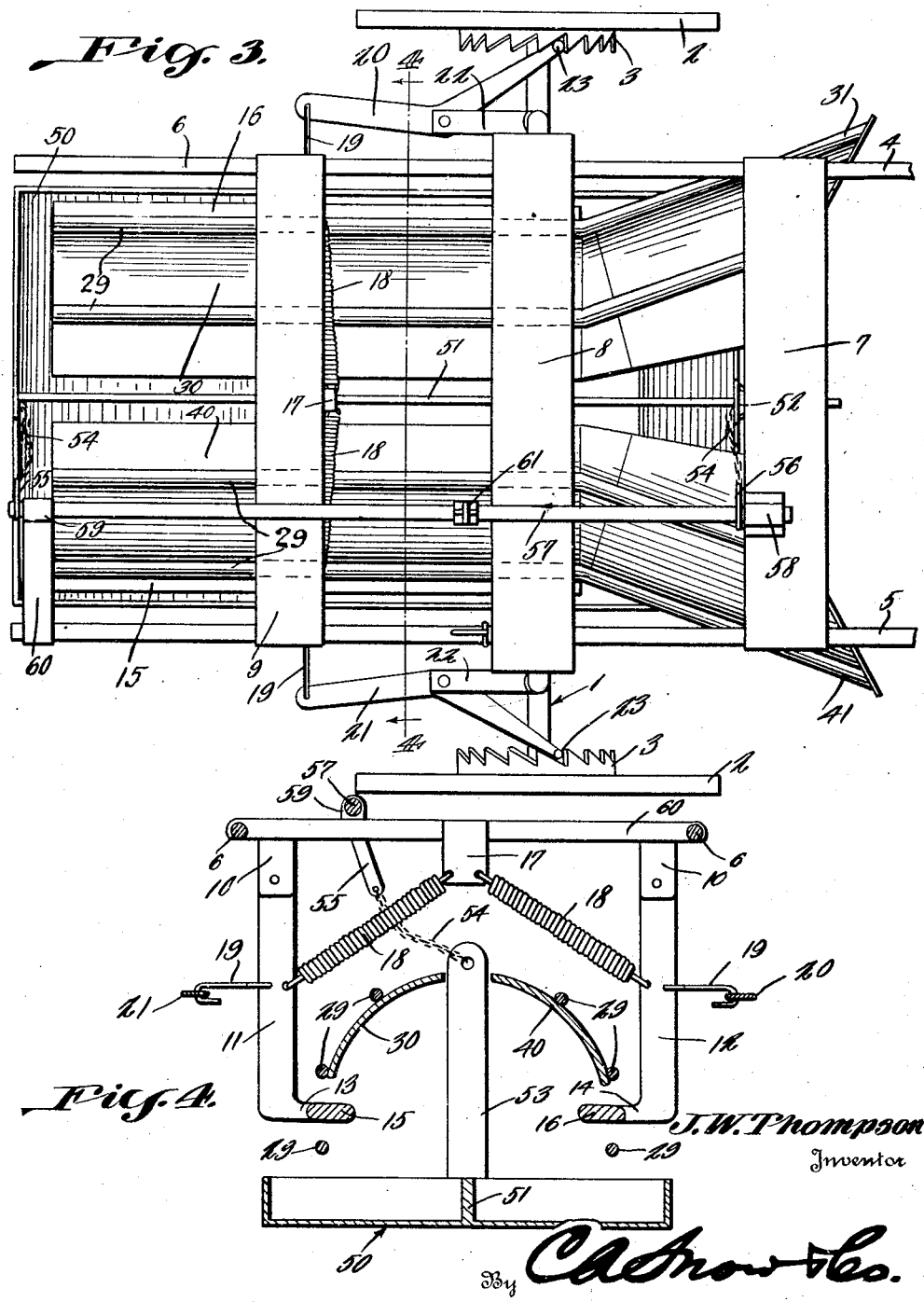

Patented Sept. 15, 1925.

1,553,487

UNITED STATES PATENT OFFICE.

JAMES W. THOMPSON, OF HARLINGEN, TEXAS.

BOLL-WEEVIL CATCHER.

Application filed August 11, 1923. Serial No. 656,795.

*To all whom it may concern:*

Be it known that I, JAMES W. THOMPSON, a citizen of the United States, residing at Harlingen, in the county of Cameron and State of Texas, have invented a new and useful Boll-Weevil Catcher, of which the following is a specification.

This invention relates to boll weevil catchers and bug exterminators.

The object of the invention is to provide an apparatus of this character so constructed as to agitate a plurality of rows of cotton at a time and hold the bugs so that they cannot escape and in which all the stalks of each plant are brought under the fenders and the plant thoroughly shaken before it passes out of the catcher.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Fig. 3 is a top plan view; and

Fig. 4 is a transverse section taken on the line 4—4 of Fig. 3.

Figure 1:
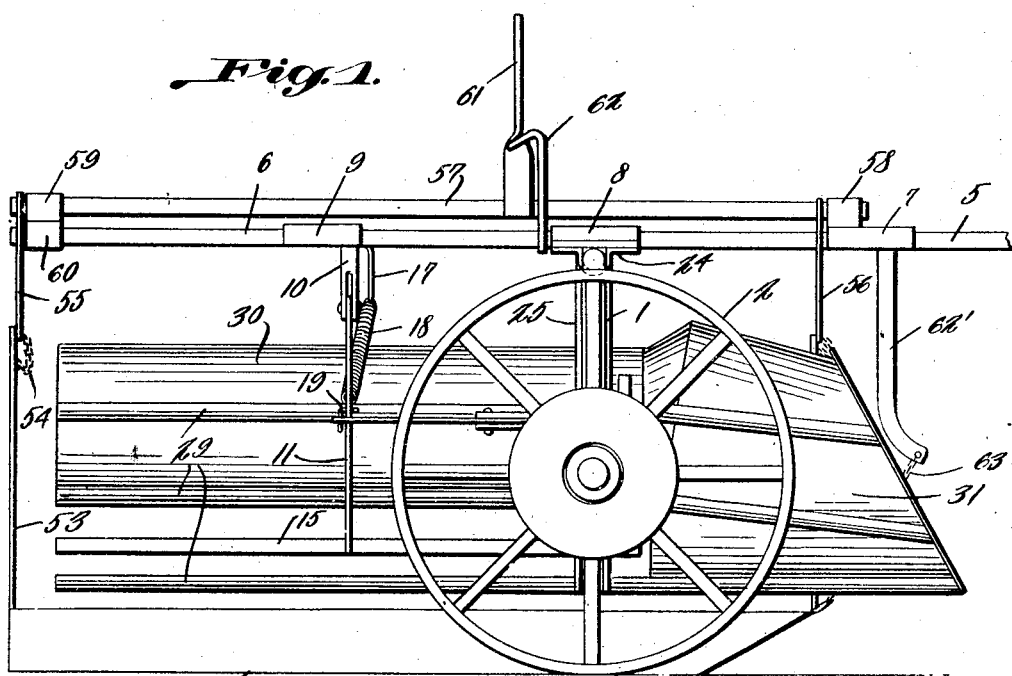
Figure 1 represents a side elevation of an apparatus constructed in accordance with this invention.
Figure 2:
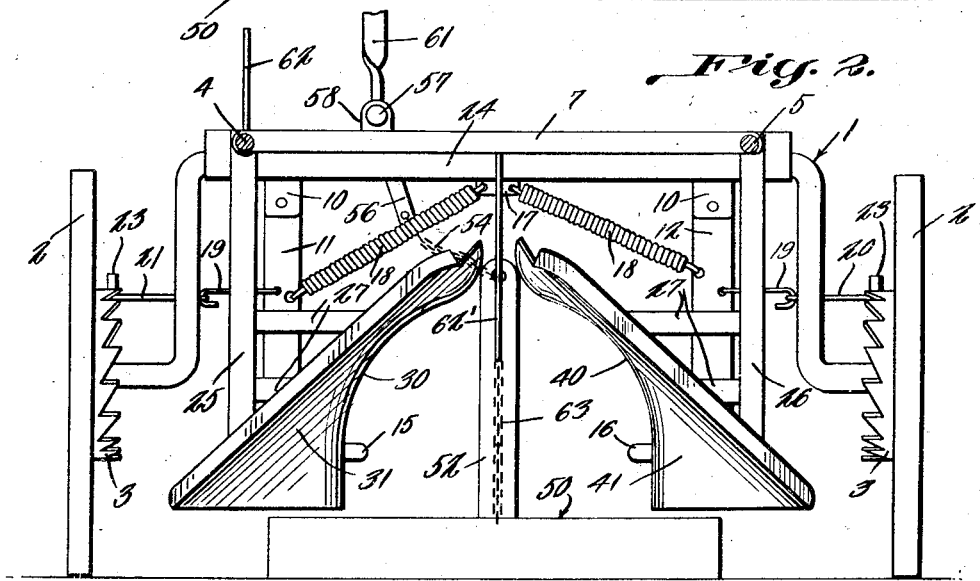
Fig. 2 is a front elevation thereof.

In the embodiment illustrated a crank axle 1 is shown having mounted on the opposite ends thereof wheels 2 each equipped on its inner face with an annular ratchet 3 for a purpose hereinafter to be described.

This device is designed to be drawn by one horse and the thills 4 and 5 thereof which are carried by the axle 1 have rearward extensions 6 connected by cross bars 7, 8 and 9 the intermediate bar 8 being located above the cross bar of the crank axle.

The rear cross bar 9 has depending from the opposite ends thereof hangers 10 on which are pivotally mounted one end of depending bars 11 and 12 the lower ends of which are equipped with laterally projecting inwardly extending arms 13 and 14 which are rigidly secured, being preferably made integral with agitator bars 15 and 16. These bars are arranged longitudinally of the apparatus throughout the greater part of the length thereof and are laterally movable by the oscillation of the depending bars 11 and 12.

Depending from the bar 9 intermediate the ends thereof is a hanger 17 with which is connected coiled springs 18 which are also connected with the carriers 11 and 12 and exert their tension to move said carriers inwardly toward each other so that when they are swung outwardly by means presently to be described they will be returned by these springs and thereby impart a laterally shaking movement to the agitators 15 and 16.

Links 19 connect the carriers 11 and 12 with one end of obtuse angled levers 20 and 21 which are fulcrumed at their bends or elbows on brackets 22 projecting rearwardly from the upright portions of the axle 1. The front ends of the levers 20 and 21 have upstanding fingers 23 positioned to engage the teeth of the ratchets 3, the levers 20 and 21 thus operating as pawls which are rocked on their fulcrums by the engagement of the teeth 3 with the fingers 23 during the rotation of the wheels 2.

Arranged below the cross-bar of the axle 1 and made U-shaped in cross section to receive said axle cross-bar is a plate 24 which extends beyond the thill extensions 6 and is secured to the ends of the intermediate cross-bar 8, said ends being offset downwardly for this purpose. Depending from the plate 24 are uprights 25 and 26 rigidly secured to said plate and having a plurality of laterally extending inwardly projecting arms 27 to which are fixedly secured fenders 30 and 40. These fenders are preferably constructed of sheet iron plates curved transversely with the convex portions extending outwardly as shown clearly in Fig. 4. These fenders are spaced apart at their upper ends and are provided at their front ends with flared mouths 31 and 41. The fenders are shown reinforced by longitudinally extending rods 29 to which the arms 27 are fixedly secured. The fenders have their lower portions between the two lowermost rods 29 cut away to provide for the movement of the agitators 15 and 16, at these points.

A bug catching or receiving pan 50 is mounted below the fenders 30 and 40 and extends throughout the full length thereof being wider than the fenders as is shown clearly in Fig. 4. This pan is preferably divided longitudinally by a partition 51 although not necessarily, said partition in addition to forming two compartments in the pan operates as a stiffening rib for the pan.

Two standards 52 and 53 are rigidly secured to the front and rear ends of the pan 50 and are connected by flexible elements 54 with laterally extending arms 55 and 56 projecting inwardly from a shaft 57 which is mounted to turn in suitable bearings 58 and 59 carried respectively by the cross-bar 7 and a bracket 60 extending laterally inward from one of the thill extensions 6.

An arm 61 extends laterally from the shaft 57 and is designed to be engaged with an upstanding catch 62 carried by the thill extension on which the bracket 60 is mounted and when said arm 61 is so engaged the pan 50 will be raised and held out of contact with the ground so that the machine may be transported from place to place without the pan dragging which it is intended to do when in operation for catching boll weevils.

The machine is made of the size to adapt it to operate on two rows of cotton plants. The plants of the rows being drawn in by the flared mouths 31 and 41 under the fenders 30 and 40 carrying the passage of the machine over the rows, the pan 50 dragging along on the ground below the fenders and the agitators 15 and 16 having a laterally shifting movement imparted thereto by the engagement of the fingers 23 with the ratchets 3 on the wheels 2. This movement of the agitators cause them to engage the stalks of the plants near their roots and in connection with the fenders thoroughly shake the plants causing any boll weevil or other insects to be dislodged and deposited in the pan 50 the fenders preventing any insects from escaping at the sides of the pan.

A bar 62' depends from the front cross-bar 7 and is connected at its lower end by chain 63 with the front end of pan 50, said chain operating as a stop to limit the rearward movement of the pan 50 to insure its proper positioning below the fenders.

In the use of this apparatus which is drawn by one horse over two rows of cotton the fenders gather the cotton plants, bending them over the pan 50 and preventing the escape of bugs at the sides while the agitators 15 and 16 strike against the lower part of the cotton stalks and effectively shake off all boll weevil and other insects during the passage of the machine, said insects being caught in the pan 50.

Various changes in the form, shape, proportion and other minor details of construction may be made without departing from the principle or sacrificing any of the advantages of the claimed invention.

I claim:—

In an apparatus of the class described, a wheeled supporting structure, a bug receiving pan mounted to drag between two rows of cotton, oppositely curved laterally spaced fenders positioned over said pan, said fenders being convexo-concavo in cross section and reinforced throughout their length, oppositely flared mouths at the front ends of said fenders to gather in the cotton plants to be shaken, depending bars pivotally mounted at their upper ends on the supporting structure and having their lower ends equipped with inwardly turned fingers, longitudinally extending agitator bars carried by said fingers below the lower edges of said fenders and adapted to engage the stalks of the cotton plants to shake them, and means operable by the turning of the wheel to actuate said agitator.

In testimony that I claim the foregoing as my own, I have hereto affixed my signature.

JAMES W. THOMPSON.